United States Patent
Rodriguez et al.

(10) Patent No.: US 11,431,062 B2
(45) Date of Patent: Aug. 30, 2022

(54) MANUAL SERVICE DISCONNECT FOR A BATTERY SYSTEM

(71) Applicant: Rivian IP Holdings, LLC, Plymouth, MI (US)

(72) Inventors: Jorge Rodriguez, Ladera Ranch, CA (US); Tyler Collins, Irvine, CA (US); Kyle Butterfield, Rancho Santa Margarita, CA (US); Nathaniel C. Wynn, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 128 days.

(21) Appl. No.: 16/683,096

(22) Filed: Nov. 13, 2019

(65) Prior Publication Data

US 2020/0152950 A1    May 14, 2020

Related U.S. Application Data

(60) Provisional application No. 62/760,898, filed on Nov. 13, 2018.

(51) Int. Cl.
*H01M 50/502* (2021.01)
*H01M 50/20* (2021.01)

(52) U.S. Cl.
CPC ........ *H01M 50/502* (2021.01); *H01M 50/20* (2021.01); *H01M 2220/20* (2013.01)

(58) Field of Classification Search
None
See application file for complete search history.

(56) References Cited

U.S. PATENT DOCUMENTS

2015/0207130 A1*  7/2015  Maguire ............... B60L 3/0046
                                                429/97

FOREIGN PATENT DOCUMENTS

EP       2 423 026      2/2012
EP       2 695 767      2/2014

OTHER PUBLICATIONS

International Search Report and Written Opinion of PCT/US2019/061302 dated Feb. 24, 2020.

* cited by examiner

*Primary Examiner* — Wyatt P McConnell
(74) *Attorney, Agent, or Firm* — Haley Guiliano LLP

(57) ABSTRACT

An interconnect is disclosed that opens a battery circuit when an access cover is removed. The interconnect includes a single installed position, and does not include any throw positions to avoid ambiguity. The interconnect includes a conductive element that closes the battery circuit when the interconnect is installed. The access cover cannot be removed when the interconnect is installed, because the interconnect includes at least one mechanical feature that prevents removal of the access cover. In some instances, the interconnect is integrated into the access cover, such that when the cover is removed, the circuit is opened necessarily during removal. The interconnect interface may include blades, pins, or other electrically conducting elements. The interconnect is arranged in the battery system away from power electronics and other components that may interface to an electrical load, thus providing an added measure of safety when the access cover is off.

21 Claims, 5 Drawing Sheets

MANUAL SERVICE DISCONNECT FOR A BATTERY SYSTEM

CROSS REFERENCE TO RELATED APPLICATION

This application claims the benefit of U.S. Provisional Patent Application No. 62/760,898 filed Nov. 13, 2018, the disclosure of which is hereby incorporated by reference herein in its entirety.

SUMMARY

In a high-voltage or high-energy electrical system, for which maintenance may pose an electrical hazard, the Manual Service Disconnect (MSD) is an important component. The MSD is used to manually sever the main current path to ensure an open circuit. For example, this type of device is especially common in high voltage batteries. The use of this component presents some disadvantages as it is large and expensive. Further, this type of device only provides protection if the user knows or remembers to remove it before exposing themselves to electrical hazards, thus requiring proper training and procedure. It would be advantageous to include a MSD that must be removed by a sequence of assembly prior to removing the cover of a battery system, to avoid exposing a person to live electrical circuit inside a battery back. It would also be advantageous for a MSD to be easily and simply installed to prevent ambiguity in the state of the power circuit.

In some embodiments, the present disclosure is directed to an interconnect for a battery system. The interconnect includes at least one conductive element and at least one feature configured to, when installed, prevent removal of a battery cover. The at least one conductive element is configured to couple a first electrical terminal and a second electrical terminal together. The at least one feature covers the first electrical terminal and the second electrical terminal. The interconnect is a rigid assembly, for which the at least one conductive element and the at least one feature have a single installed position. For example, the at least one conductive element has a single throw position.

In some embodiments, when the interconnect is installed, the at least one conductive element includes a single position relative to the battery system and the at least one feature comprises a single position relative to the battery system.

In some embodiments, the interconnect includes a fastener configured to engage with a housing of the battery system when installed.

In some embodiments, the battery system includes a plurality of battery modules, and the at least one conductive element is configured to couple the first electrical terminal and the second electrical terminal at an intermediate node of the battery modules. For example, in some embodiments, the interconnect couples a first plurality and a second plurality of battery modules together.

In some embodiments, the battery system includes an interface to a load, and the interconnect is configured to couple the first electrical terminal and the second electrical terminal at least a battery module's length away from the interface. For example, a battery module's length may correspond to a relatively safe distance to reduce the risk of a user causing a short at or near the load.

In some embodiments, the battery system includes an interlock loop that includes the first electrical terminal and the second electrical terminal, where the at least one conductive element comprises a single installed position that closes the interlock loop. The battery system also includes an electromechanical disconnect system electrically coupled to the interlock loop, where the electromechanical disconnect system is prevented from being closed when the interlock loop is open.

In some embodiments, the at least one conductive element and the at least one feature are rigidly coupled together, and cannot move relative to each other.

In some embodiments, the present disclosure is directed to a battery system. The battery system includes a first plurality of battery modules coupled together in series and a second plurality of battery modules coupled together in series. The battery system also includes a battery cover configured to cover the first plurality of battery modules and the second plurality of battery modules to prevent access from outside the battery cover. The battery system further includes a first electrical terminal coupled to the first plurality of battery modules, a second electrical terminal coupled to the second plurality of battery modules, and an interconnect. The interconnect, when installed, is configured to couple the first electrical terminal to the second electrical terminal and prevent the battery cover from being removed. The interconnect, when removed, is configured to decouple the first electrical terminal from the second electrical terminal and allow the battery cover to be removed.

In some embodiments, the battery system includes an interface configured to couple the first plurality of battery modules and the second plurality of battery modules to an electric load. When the interconnect is removed, there is no substantial voltage from the first plurality of battery modules and the second plurality of battery modules present at the interface. For example, in some embodiments, the interface and the interconnect are arranged with at least one battery module in between in at least one spatial dimension.

In some embodiments, the battery system includes a housing to which the first plurality of battery modules and the second plurality of battery modules are affixed, and the cover is configured to engage with the housing. In some embodiments, the battery system includes an interconnect socket configured to engage with the interconnect, wherein the first electrical terminal and the second electrical terminal are arranged in the interconnect socket. For example, in some embodiments, the interconnect socket is rigidly affixed to the housing, and the interconnect socket is configured to engage with the interconnect when the battery cover is installed.

In some embodiments, the interconnect is a substantially rigid body and has a single installed position.

In some embodiments, the present disclosure is directed to a battery system. The battery system includes a first battery module, a second battery module, a first electrical terminal coupled to the first battery module, a second electrical terminal coupled to the second battery module, and a cover. The cover is configured to, when installed, prevent access to the first battery module and the second battery module. The cover includes a conductive element configured to, when installed, electrically couple the first electrical terminal and the second electrical terminal.

In some embodiments, the conductive element is configured to, when the cover is removed, electrically decouple the first electrical terminal and the second electrical terminal.

In some embodiments, the conductive element is constrained to not move relative to the rest of the cover.

In some embodiments, the conductive element includes a first metal pin configured to engage the first electrical terminal and a second metal pin configured to engage the second electrical terminal. The second metal pin is electrically coupled to the first metal pin.

In some embodiments, the conductive element includes a blade configured to engage the first electrical terminal and the second electrical terminal.

In some embodiments, the battery system includes a housing to which the cover is configured to engage with, an interconnect socket affixed to the housing, and at least one locating feature. The first electrical terminal and the second electrical terminal are arranged in the interconnect socket. The at least one locating feature is configured to align the cover to the housing when the cover is installed.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
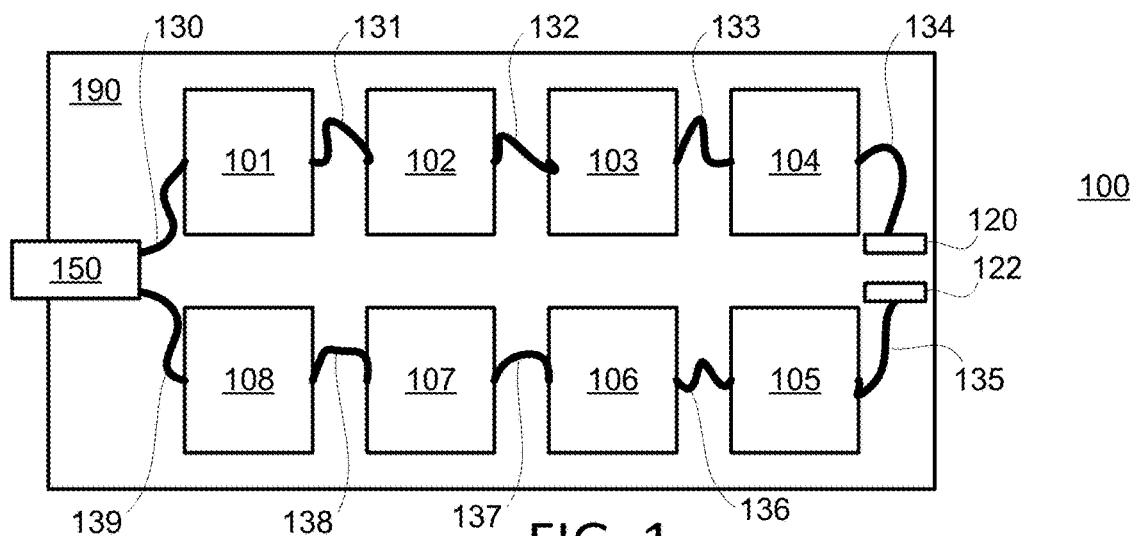
FIG. 1 shows a top view of an illustrative battery system without a battery cover, in accordance with some embodiments of the present disclosure.

The present disclosure is directed to a MSD that engages with, or is integrated into, a battery system cover to prevent access to electrical hazards. In some embodiments, the present disclosure is directed to using the MSD to mechanically lock an outer case of an electrical hazard, where the MSD is a removable part of the electrical circuit. A MSD is also referred to herein as an interconnect (e.g., a removable interconnect).

In some embodiments, the present disclosure is directed to a MSD that must be removed prior to being able to remove a battery system cover. For example, the MSD may be installed using a sequence of assembly, such that the cover, lid, or access panel physically cannot be removed without the removal of the MSD. In an illustrative example, the battery cover is bolted down, and includes a small pass-through hole for the MSD. The MSD has a flange around the perimeter that engages with the battery cover such that once inserted, overlaps the battery cover. The MSD is then bolted down, to something other than the cover, to seal the battery case. In this illustrative example, even if all the battery cover bolts were removed, the cover would not be removable without taking out the MSD.

In some embodiments, the present disclosure is directed to a MSD that is integrated into a battery system cover, such that when the cover is removed, an electrical circuit is opened. For example, the cover may be installed using a sequence of assembly, such that the MSD completes the electrical circuit when the cover is installed. In an illustrative example, the battery cover is bolted down, and includes a MSD in the form of a pronged connector. The pronged connector engages with electrical terminals (e.g., of battery modules or of a high voltage interlock loop), thus completing the electrical circuit. In this illustrative example, if the battery cover is removed, the circuit is necessarily interrupted.

By including a removable MSD that must be disengaged before removing a cover, the system is guaranteed to be an open circuit when the cover is removed and immediately after. In many circumstances, this may be preferable to inclusion of a switch, contactor, or electronic control. For example, a switch can become damaged, and indicate a safe condition when the corresponding electrical circuit is still connected (e.g., thus providing a false sense of safety). The present disclosure also provides illustrative designs including a sequence of disassembly, rather than relying on written procedures or training. For example, when the cover is removed, the circuit is unequivocally open, thus eliminating ambiguity. In some embodiments, the present disclosure provides and maintains functionality according to industry standards during crash and other emergency situations (e.g., non-MSD related) while still protecting users during pack disassembly (e.g., which may be a requirement for functional safety conformity).

In some embodiments, the present disclosure may be applied to any suitable electrical cabinet intended to shield personnel from live electrical conductors such as, for example, switchgear equipment, inverter cabinets, and other enclosures.

Figure 2:
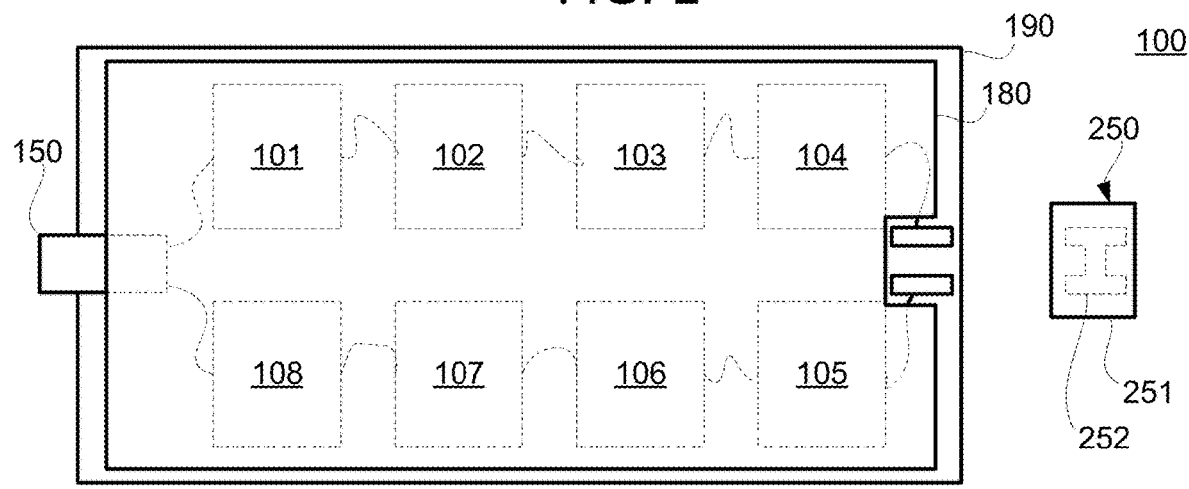
FIG. 2 shows a top view of the illustrative battery system of FIG. 1 with the battery cover installed, but the MSD uninstalled, in accordance with some embodiments of the present disclosure.
Figure 3:
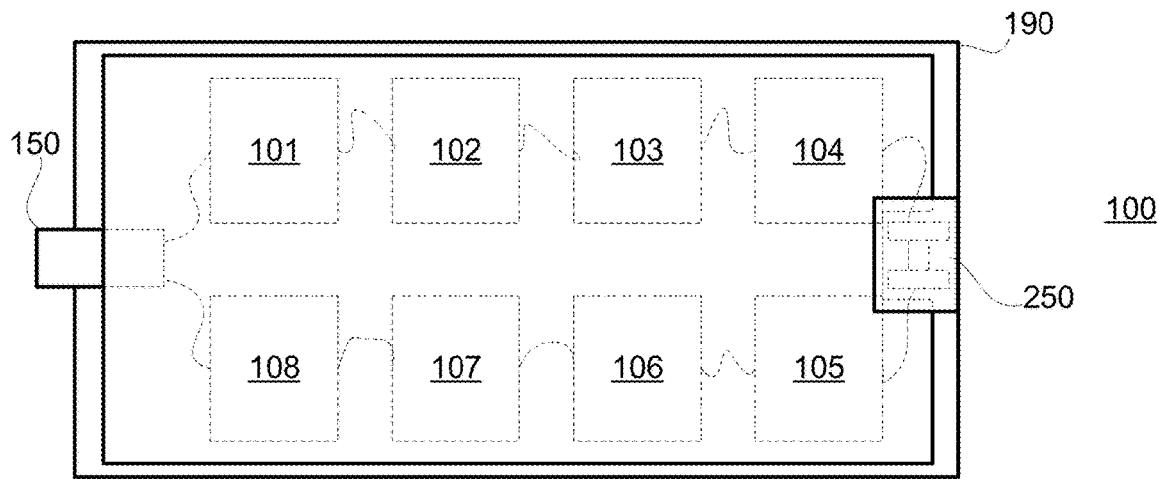
FIG. 3 shows a top view of the illustrative battery system of FIG. 1 with the battery cover installed, and the MSD installed, in accordance with some embodiments of the present disclosure.

FIG. 1 shows a top view of illustrative battery system 100 without a battery cover, in accordance with some embodiments of the present disclosure. FIG. 2 shows a top view of illustrative battery system 100 of FIG. 1 with battery cover 180 installed, but MSD 250 uninstalled, in accordance with some embodiments of the present disclosure. FIG. 3 shows a top view of illustrative battery system 100 of FIG. 1 with battery cover 180 installed, and MSD 250 installed, in accordance with some embodiments of the present disclosure.

In some embodiments, battery system 100 may be configured to power an electric vehicle. Battery system 100 includes battery modules 101, 102, 103, 104, 105, 106, 107, and 108, power interface 150, and terminals 120 and 122. As shown in FIGS. 1-3, battery modules 101-104 are coupled together in series with interconnects 130-134 (e.g., insulated cables of suitable gage). As shown in FIGS. 1-3, battery modules 105-108 are coupled together in series with interconnects 135-139 (e.g., insulated cables of suitable gage). Although shown as coupled in series, battery modules 101-104 and battery modules 105-108 may be coupled in series, parallel, or a combination thereof. Battery modules 101-108 are arranged in housing 190, which is configured to provide position securement, shock absorbance, crash protection, any other suitable function, or any combination thereof.

In an illustrative example, each of battery modules 101-108 may include a plurality of batteries, each with a DC voltage of nominally 50V, such that the voltage across battery modules 101-104 is nominally 200V, and the voltage across battery modules 105-108 is nominally 200V. In a further example, nine battery modules may be included and grouped into two groups (e.g., a group of four and a group of five), with the battery modules in each group connected in series.

Interface 150 may include, for example, power conditioning components, contactors, fuses, sensors (e.g., for current, voltage, or temperature measurement, or a combination thereof), high-voltage connectors, any other suitable power electronics or circuitry, or any combination thereof. In some embodiments, interface 150 may be able to be disconnected/connected to an electric load (e.g., a DC motor of an electric vehicle). In some embodiments, when terminals 120 and 122 are not coupled together, no voltage is available at interface 150 and any circuitry between interface 150 and the electric load. In some embodiments, when terminals 120 and 122 are not coupled together, voltage is still available among each group of battery modules 101-104 and battery modules 105-108. In some embodiments, the geometric arrangement of battery modules 101-108 illustrated in FIGS. 1-3 allows the maximum voltage that is present anywhere in battery system 100 to be halved when MSD 250 is removed.

Terminals 120 and 122, if coupled together, put battery modules 101-108 in series (e.g., by connecting interconnects 134 and 135), and make the full voltage thereof available at interface 150. If uncoupled, terminals 120 and 122 decouple battery modules 101-104 from battery modules 105-108 (e.g., by disconnecting interconnects 134 and 135), and accordingly no voltage is present across interface 150. Although shown illustratively in FIGS. 1-3 as arranged between battery modules 104 and 105, terminals 120 and 122 may be arranged between any suitable battery modules. In some embodiments, more than one pair of terminals may be included, and each arranged between a respective pair of battery modules. For example, a battery system may include one, two, three, or four MSDs, or any other suitable number of MSDs. Further, if more than one MSD is included, each may need to be removed to remove a battery cover and allow access to the battery modules.

FIG. 2 shows a top view of illustrative battery system 100 of FIG. 1 with battery cover 180 installed, but MSD 250 uninstalled, in accordance with some embodiments of the present disclosure. For example, battery cover 180 may be aligned to and affixed to housing 190. In an illustrative example, housing 190, battery cover 180, or both, may include locating features (e.g., pins, holes, slots, lips, tongue-and-groove features, or other features), threaded holes (e.g., for fasteners), through holes (e.g., for fasteners), clips, clamps, latches, visible alignment markings, any other suitable hardware or features, or any combination thereof. In some embodiments, battery cover 180 is configured and arranged to cover battery modules 101-108, at least some electrical terminals, at least some electrical interconnects, at least some of interface 150, or a combination thereof. Covering as used herein refers to preventing user access (e.g., hands) from contacting components which may include high voltages. Accordingly, battery cover 180 may be a contiguous part (e.g., with no holes or other through features), a perforated part (e.g., including holes or other through features which are not large enough to permit access), or a compound part (e.g., a frame, set of bars, or other arrangement of other parts).

As illustratively shown in FIGS. 2-3, MSD 250 includes electrically conductive path 252. In some embodiments, electrically conductive path 252 may include a section of sheet metal or metal bar (e.g., copper, aluminum, or other suitable conductive metal or alloy), a cable, a shunt, a fuse, or any other suitable electrical coupling. In some embodiments, electrically conductive path 252 may include two pins, blades, sockets, or other suitable electrical terminals that are electrically coupled to each other and each configured to engage one of electrical terminals 120 and 122. For example, conductive path 252 may include a two-prong connector, wherein the prongs are electrically conductive, electrically coupled to each other, and configured to engage electrical terminals 120 and 122.

As illustratively shown in FIGS. 2-3, MSD 250 includes body 251. Body 251 is configured to provide electrical insulation between electrically conductive path 252 and the exterior surface of body 251 (e.g., the surface accessible by a user when MSD 250 is installed on battery system 100. In some embodiments, body 251 is also configured to provide structural rigidity to electrically conductive path 252, battery cover 180, electrical terminals 120 and 122, or a combination thereof. In some embodiments, MSD 250 is a single, rigid body, with no included mechanical interfaces intended for relative motion within MSD 250. In some embodiments, MSD 250 has a single installed configuration, providing an unambiguous connected state or unconnected state. For example, as installed, MSD 250 does not include a switch throw or changeable position. The absence of a switch throw, for example, eliminates further failure modes, false indications of safety (e.g., such as can occur with a failed contactor), misaligned installation, achieving unstable inter-throw positions, and other potentially unsafe conditions. For example, in some embodiments, MSD 250 is a rigid assembly of electrically conductive path 252 and body 251, configured to engage housing 190 thereby blocking removal of battery cover 180. MSD 250 may be, but need not be, affixed to battery cover 180 when installed. In some embodiments, MSD 250 is affixed to housing 190. For example, if all fasteners securing battery cover 180 to housing 190 are removed, battery cover 180 still is not removable until MSD 250 is removed. Because MSD 250 is secured to housing 190, in some embodiments, and blocks at least a portion of battery cover 180, battery cover 180 is not removable until MSD 250 is removed. Accordingly, when MSD 250 is removed, interconnects 134 and 135 are disconnected. In some embodiments, MSD 250 need not engage with housing 190, and may, for example, engage with electrical terminals 120 and 122 (e.g., which may include latching features configured to engage with MSD 250). In some embodiments, MSD 250 may be configured to engage with a battery module, one or more components mounted to housing 190, or any other suitable reference structure aside from battery cover 180.

FIG. 3 shows a top view of illustrative battery system 100 of FIG. 1 with battery cover 180 installed, and MSD 250 installed, in accordance with some embodiments of the present disclosure. Battery system 100, as shown in FIG. 3, is configured to have voltage available at interface 150. Battery cover 180 is secured to housing 190, and MSD 250 is also secured to housing 190, terminals 120 and 122, or other suitable reference structure aside from battery cover 180. MSD 250 may be fastened (e.g., with a bolt, screw, or lock-nut) to, latched to (e.g., with any suitable latching mechanism, cam lock mechanism, or other latch), or otherwise affixed to housing 190, or a component affixed to housing 190. As shown in FIG. 3, battery system 100 may be considered ready to couple to an electric load (e.g., electrical terminals 120 and 122 are electrically coupled). Accordingly, access to battery modules 101-108, interconnects 130-139, and electrical terminals 120 and 122 is now prevented by battery cover 180 and MSD 250.

As shown in FIGS. 2-3, MSD 250 has three states, at least. State (1) is completely uninstalled, wherein electrical terminals 120 and 122 are not electrically coupled, and MSD 250 is not secured to housing 190 or a component affixed to housing 190. State (2) is partially installed, wherein electrical terminals 120 and 122 are electrically coupled, but MSD is not secured to housing 190 or a component affixed to housing 190. State (3) is completely installed, wherein electrical terminals 120 and 122 are electrically coupled, and MSD 250 is secured to housing 190 or a component affixed to housing 190. Also, as shown in FIGS. 2-3, battery cover 180 cannot be removed when MSD 250 is completely installed. Battery cover 180 can only be removed if MSD 250 is either completely removed, or at least unsecured from housing 190 (or in some examples, a component secured to housing 190). Accordingly, from a fully operational configuration (e.g., that shown in FIG. 3), battery cover 180 can only be removed if MSD 250 is removed. In some embodiments, MSD 250 cannot be installed if battery cover 180 is not installed. In some embodiments, a battery cover may engage a mechanism that allows electrical terminals to accommodate a MSD. For example, when battery cover 180 installed, it may release a terminal cover configured to cover terminals 120 and 122, thus allowing MSD 250 to be installed. Further, when battery cover 180 is not installed, MSD 250 cannot be installed unless the mechanism releasing the terminal cover is engaged. In some embodiments, MSD 250 or other suitable device (not shown) may be configured to be optionally installed after battery cover 180 has been removed, or otherwise without battery cover 180 in place. For example, after removal of battery cover 180 for service, MSD 250 may be reinstalled to perform electrical testing on the full, electrically-coupled stack of battery modules 101-108. Because MSD 250 is a single component, with a single installed configuration, the immediate state of electrical connection (e.g., connected or disconnected) between electrical terminals 120 and 122 as battery cover 180 is removed is unambiguous.

Figure 4:
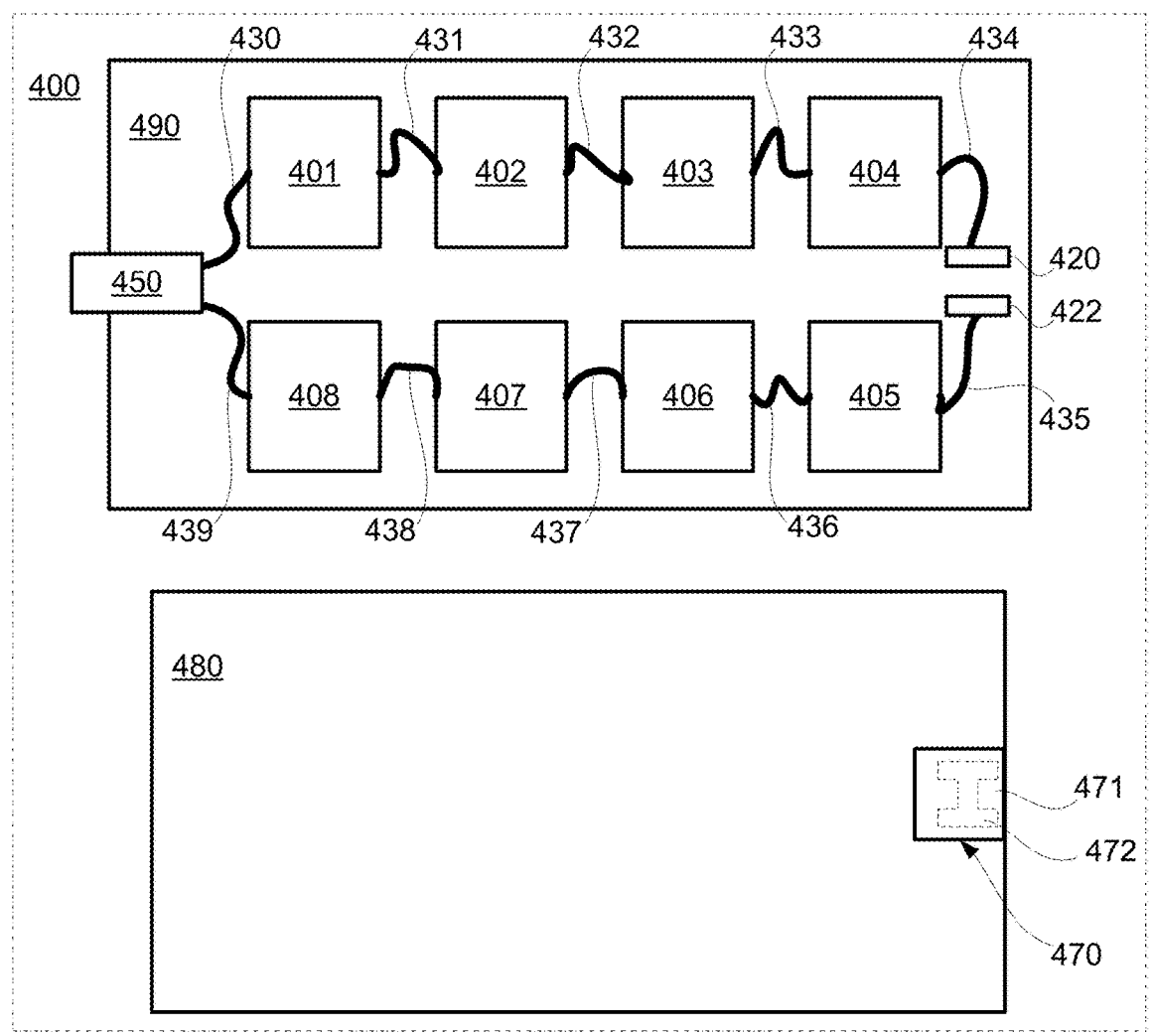
FIG. 4 shows a top view of an illustrative battery system with an uninstalled battery cover having an integrated MSD, in accordance with some embodiments of the present disclosure.
Figure 5:
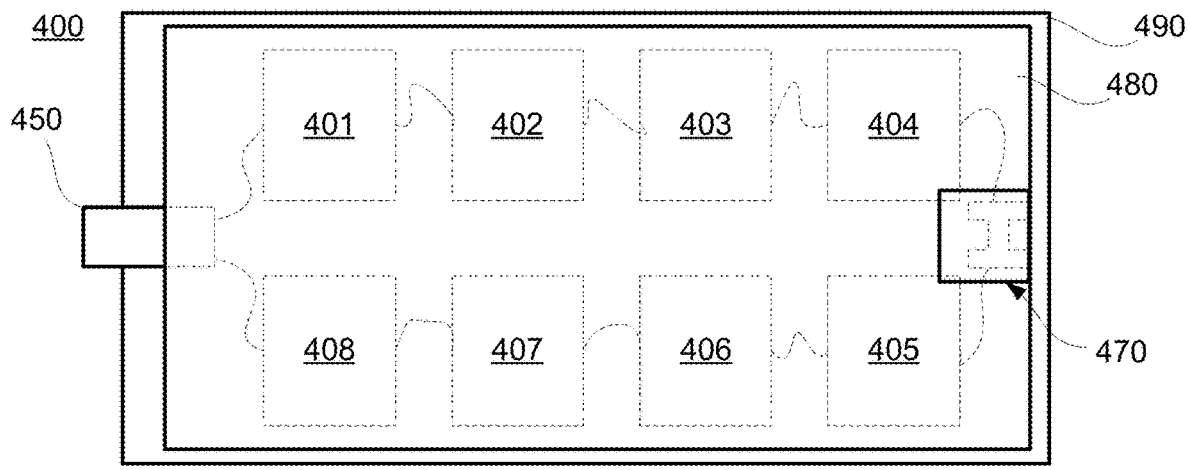
FIG. 5 shows a top view of the illustrative battery system of FIG. 4 with the battery cover installed, in accordance with some embodiments of the present disclosure.

FIG. 4 shows a top view of illustrative battery system 400 with uninstalled battery cover 480 having integrated MSD 470, in accordance with some embodiments of the present disclosure. FIG. 5 shows a top view of illustrative battery system 400 of FIG. 4 with battery cover 480 installed, in accordance with some embodiments of the present disclosure.

Battery system 400 provides an illustrative example of a system having less parts than battery system of FIGS. 1-3, for example. In some embodiments, battery system 400 may be configured to power an electric vehicle. Battery system 400 includes battery modules 401, 402, 403, 404, 405, 406, 407, and 408, interface 450, and terminals 420 and 422. As shown in FIGS. 4-5, battery modules 401-404 are coupled together in series with interconnects 430-434 (e.g., insulated cables of suitable gage). As shown in FIGS. 4-5, battery modules 405-408 are coupled together in series with interconnects 435-439 (e.g., insulated cables of suitable gage). Although shown as coupled in series, battery modules 401-404 and battery modules 405-408 may be coupled in series, parallel, or a combination thereof. Battery modules 401-408 are arranged in housing 490, which is configured to provide position securement, shock absorbance, crash protection, any other suitable function, or any combination thereof. Housing 490, battery cover 480, battery modules 401-408, electrical terminals 420 and 422, and interface 450 may be similar to housing 190, battery cover 180, battery modules 101-108, electrical terminals 120 and 122, and interface 150, respectively, of FIGS. 1-3.

In some embodiments, battery cover 480 may be aligned to and affixed to housing 490. In an illustrative example, housing 490, battery cover 480, or both, may include locating features (e.g., pins, holes, slots, lips, tongue-and-groove features, or other features), threaded holes (e.g., for fasteners), through holes (e.g., for fasteners), clips, clamps, latches, visible alignment markings, any other suitable hardware or features, or any combination thereof. In some embodiments, features such as those described immediately above may be included to prevent damage to MSD 470, MSD 470 contacting unwanted surfaces or parts of battery system 400, shorting of electrical terminals 420 and 422 by conductive surfaces, damage to battery cover 480, damage to housing 490, or other unintended results. For example, features may be included to prevent battery cover 480 from being installed onto housing 490 if MSD 470 is not aligned with electrical terminals 420 and 422.

In some embodiments, battery cover 480 is configured and arranged to cover battery modules 401-408, at least some electrical terminals, at least some electrical interconnects, at least some of interface 450, or a combination thereof. Covering as used herein refers to preventing user access (e.g., hands) from contacting components which may include high voltages. Accordingly, battery cover 480 may be a contiguous part (e.g., with no holes or other through features), a perforated part (e.g., including holes or other through features which are not large enough to permit access), or a compound part (e.g., a frame, set of bars, or other arrangement of other parts).

As illustratively shown in FIGS. 4-5, MSD 470 is integrated as part of battery cover 480. For example, in some embodiments, MSD 470 may represent a region of battery cover 480 and need not include a separate part. In a further example, in some embodiments, MSD 470 includes a separate part that is affixed to battery cover 480 and not intended for removal from battery cover 480 under normal operation, maintenance, or repair. For example, in some embodiments, MSD 470 need not ever be removed from battery cover 480. In a further example, in some embodiments, MSD 470 may be removed from battery cover 480 to electrically couple electrical terminals 420 and 422 when battery cover 480 is removed (e.g., for troubleshooting, diagnostics, and testing).

In some embodiments, MSD 470 includes electrically conductive path 472. In some embodiments, electrically conductive path 472 may include a section of sheet metal or metal bar (e.g., copper, aluminum, or other suitable conductive metal or alloy), a cable, a shunt, a fuse, or any other suitable electrical coupling. In some embodiments, electrically conductive path 472 may include two pins, blades, sockets, or other suitable electrical terminals that are electrically coupled to each other and each configured to engage one of electrical terminals 420 and 422. For example, conductive path 472 may include a two-prong connector, wherein the prongs are electrically conductive, electrically coupled to each other, and configured to engage electrical terminals 420 and 422. In some embodiments, for example, electrically conductive path 472 may be directly affixed to battery cover 480, and accordingly, body 471 need not be included (e.g., MSD 470 may include only electrically conductive path 472).

As illustratively shown in FIGS. 4-5, in some embodiments, MSD 470 includes body 471. Body 471 is configured to provide electrical insulation between electrically conductive path 472 and the exterior surface of body 471 (e.g., the surface accessible by a user when battery cover 480 is installed on battery system 400. In some embodiments, body 471 is also configured to provide structural rigidity to electrically conductive path 472, battery cover 480, electrical terminals 420 and 422, or a combination thereof. In some embodiments, battery cover 480 with MSD 470 is a single, rigid body, with no intended mechanical interfaces intended for relative motion. For example, in some embodiments, battery cover 480 including MSD 470 is a rigid assembly of electrically conductive path 472 and body 471, configured to engage housing 490 thereby blocking removal of battery cover 480.

Battery system 400, as shown in FIG. 5, is configured to have voltage available at interface 450. Battery cover 480 is secured to housing 490, terminals 420 and 422, or other suitable reference structure. Battery cover 480 may be fastened (e.g., with a bolt, screw, or lock-nut) to, latched to (e.g., with any suitable latching mechanism, cam lock mechanism, or other latch), or otherwise affixed to housing 490, or a component affixed to housing 490. As shown in FIG. 5, battery system 400 may be considered ready to couple to an electric load (e.g., electrical terminals 420 and 422 are electrically coupled). Accordingly, access to battery modules 401-408, interconnects 430-439, and electrical terminals 420 and 422 is now prevented by battery cover 480 including MSD 470.

As shown in FIGS. 4-5, battery cover 480 has three states, at least. State (1) is completely uninstalled, wherein electrical terminals 120 and 122 are not electrically coupled, and battery cover 480 is not secured to housing 490 or a component affixed to housing 490. State (2) is partially installed, wherein electrical terminals 420 and 422 are electrically coupled, but battery cover 480 is not secured to housing 490 or a component affixed to housing 490. State (3) is completely installed, wherein electrical terminals 420 and 422 are electrically coupled, and battery cover 480 is secured to housing 490 or a component affixed to housing 490. From a fully operational configuration (e.g., that shown in FIG. 5), if battery cover 480 is removed, MSD 470, and hence electrically conductive path 472, is also necessarily removed. In some embodiments, after removal of battery cover 480 for service, an auxiliary MSD (not shown) may be installed (e.g., engaged to electrical terminals 420 and 422) to allow electrical testing on the full, electrically coupled stack of battery modules 401-408.

In some embodiments, the arrangement of components of illustrative battery systems 100 and 400 provide a further measure of safety. For example, MSD 250 is positioned on the opposite side of housing 190 from interface 150. Likewise, MSD 470 is positioned on the opposite side of housing 490 from interface 450. Interfaces 150 and 450 include components which may require servicing and, because battery modules 401-404 are electrically decoupled from battery modules 405-408, the risk of voltage at or in the vicinity of interface 450 is reduced. For example, if a technician servicing interface 450 drops a tool or other electrical conductor, there is no risk of closing the circuit between battery modules 401 and 408 (e.g., the full voltage of battery system 400). In an illustrative example, by positioning an MSD away from an interface by a distance greater than a user-working radius (e.g., an arm's length away, or several feet away), the risk of an electrical short may be reduced. In a further illustrative example, while each of battery modules 101-108 will exhibit a voltage, the disrupted circuit provided by MSD 250 may prevent more than one battery module worth of voltage within an arm's length of interface 450, or components thereof.

Figure 6:
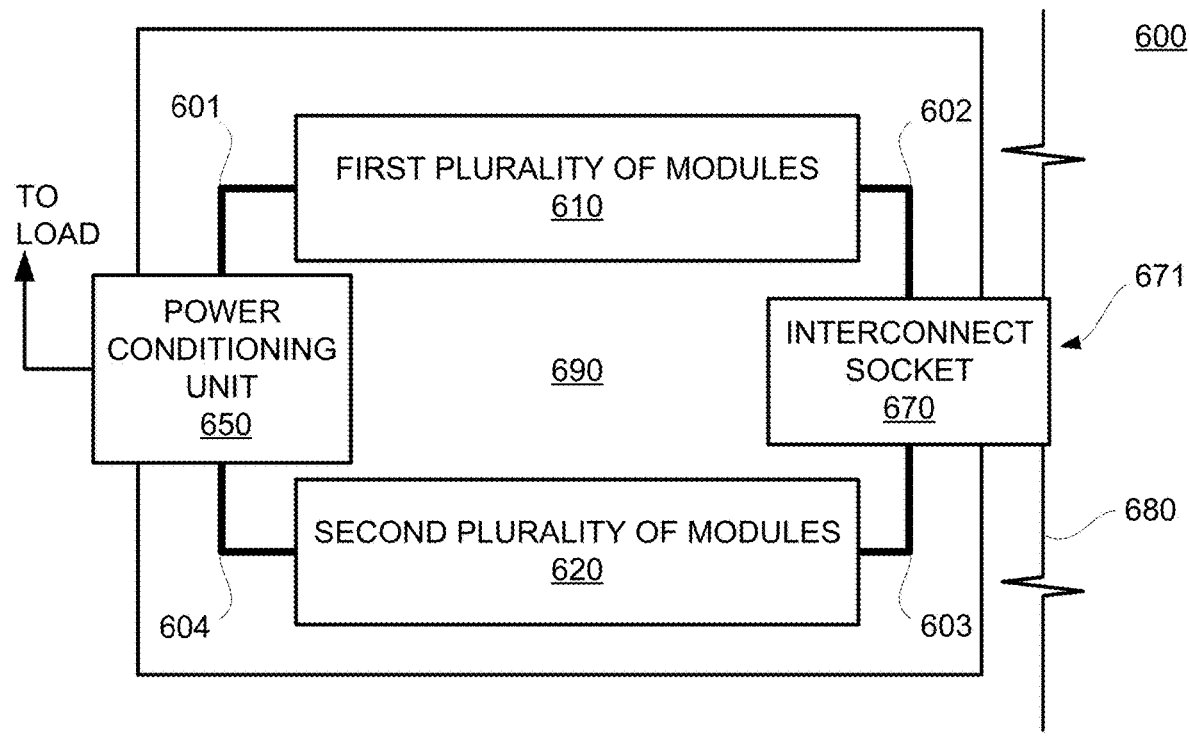
FIG. 6 shows a block diagram of an illustrate battery system in a disconnected state, in accordance with some embodiments of the present disclosure.
Figure 7:
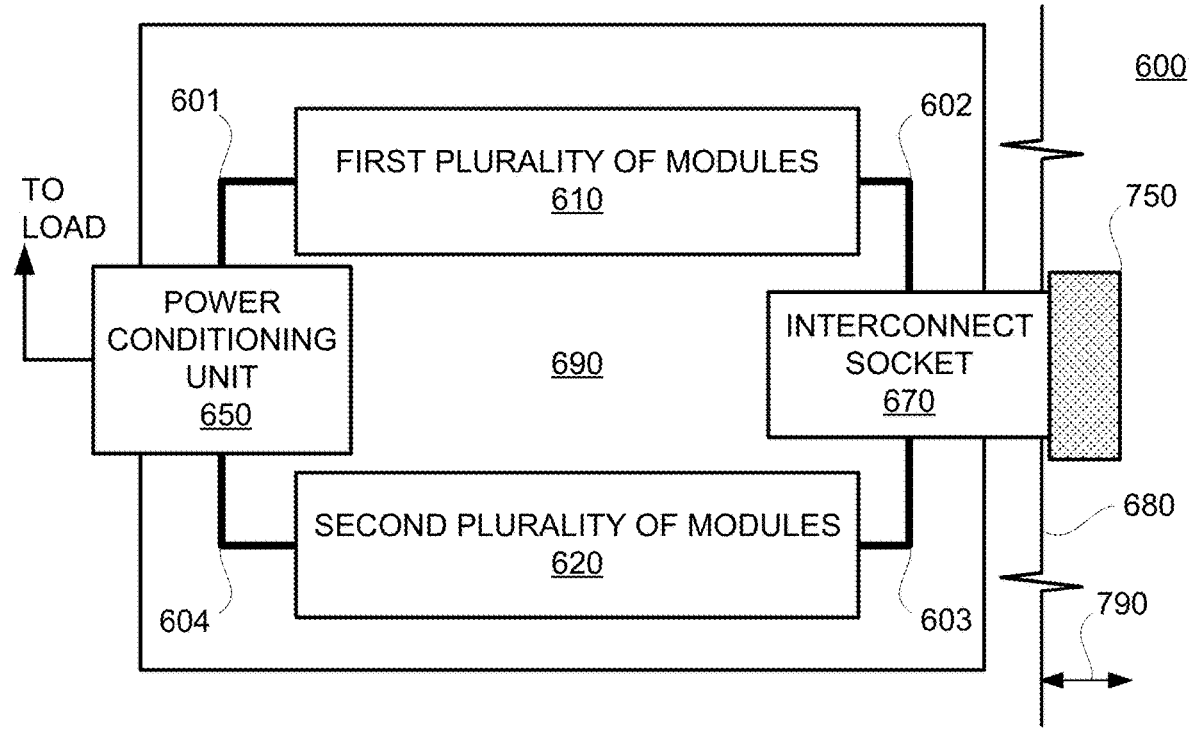
FIG. 7 shows a block diagram of an illustrate battery system in a connected state, in accordance with some embodiments of the present disclosure.

FIG. 6 shows a block diagram of illustrate battery system 600 in a disconnected state, in accordance with some embodiments of the present disclosure. FIG. 7 shows a block diagram of illustrate battery system 600 of FIG. 6 in a connected state (i.e., with MSD 750 installed), in accordance with some embodiments of the present disclosure.

Battery system 600 includes first plurality of battery modules 610, second plurality of battery modules 620, power conditioning unit 650, interconnects 601, 602, 603, and 604, battery cover 680, interconnect socket 670, and MSD 750. Note that battery cover 680 is shown only partially in FIGS. 6-7.

In some embodiments, first plurality of battery modules 610 and second plurality of battery modules 620 include the same number of battery modules (e.g., each may include four battery modules, as illustrated in FIGS. 1-5). In some embodiments, first plurality of battery modules 610 and second plurality of battery modules 620 each include a different number of battery modules (e.g., one may include four battery modules and the other may include five battery modules). Further, the voltage across first plurality of battery modules 610 may be the same as, or different from, the voltage across second plurality of battery modules 620 (e.g., although each voltage will be less than the full voltage of battery system 600 as provided at power conditioning unit 650). Each of first plurality of battery modules 610 and second plurality of battery modules 620 may include, for example, any suitable interconnects, fuses, circuit components, power conditioning components, manual disconnects (e.g., separate from MSD 750), sensors (e.g., for measuring current, voltage, or temperature), processing equipment (e.g., to process measurements or otherwise manage battery operation), any other suitable equipment, or any combination thereof.

In some embodiments, power conditioning unit 650 includes energy storage devices (e.g., capacitors), a common mode choke, sensors (e.g., to measure current, voltage, or temperature), disconnect switches, high-voltage connectors, processing equipment configured to manage battery system operation, one or more fuses, one or more shunts, any other suitable equipment, or any combination thereof.

In some embodiments, interconnect socket 670 may be rigidly affixed to, integrated in, or otherwise structurally connected to, housing 690. For example, in some embodiments, interconnect socket 670 includes a portion of housing 690, and two electrical terminals coupled respectively to interconnects 602 and 603.

Interconnect socket 670 may be arranged at any suitable position along the series of battery modules of first plurality of battery modules 610 and second plurality of battery modules 620. For example, first plurality of battery modules 610 and second plurality of battery modules 620 may include the same number of battery modules, and interconnect socket 670 may be arranged "mid-pack," such that the maximum voltage present in the system is halved when MSD 750 is removed. Any suitable number of interconnect sockets and corresponding MSDs may be included in a battery system, and arranged in any suitable configuration. In some embodiments, more than one interconnect socket and MSD may be used to constrain motion of a battery cover. For example, two interconnect sockets and corresponding MSDs may be included such that the battery cover cannot appreciably rotate relative to either interconnect socket (e.g., preventing motion of the battery cover in more than one direction). Axis 790 shows an illustrative direction in which the motion of battery cover 680 is constrained when MSD 750 is installed, for example. In some embodiments, motion, or components thereof, in directions perpendicular to axis 709 may alternately or additionally be constrained.

As shown in FIGS. 6-7, MSD 750 is configured to engage with interconnect socket 670 at interface 671. When MSD 750 is engaged to interconnect socket 670, battery cover 680 cannot be removed from housing 690 and thus first plurality of battery modules 610, second plurality of battery modules 620, and power conditioning unit 650 are inaccessible by a user. In some embodiments, MSD 750 is secured to interconnect socket 670 with threaded fasteners, a lockout device (e.g., a padlock), a latching connection (e.g., twist-lock, push-lock, or press-release connector), any other suitable means for securement, or any combination thereof.

Figure 8:
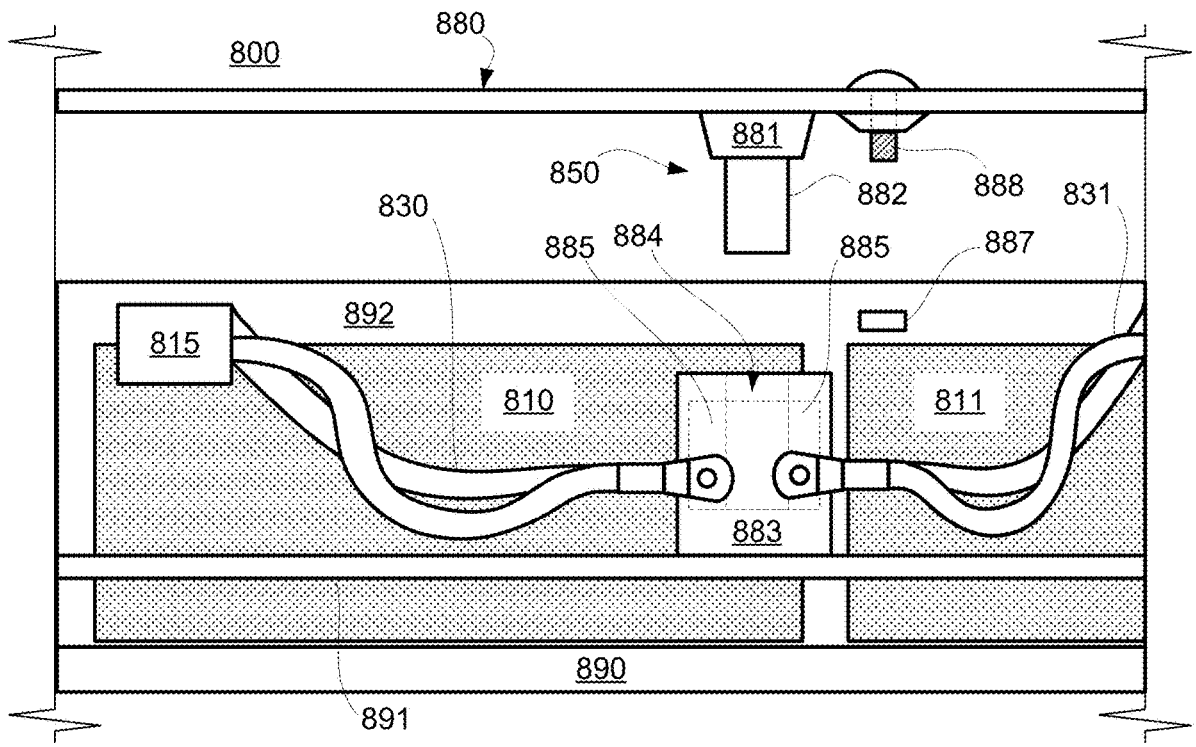
FIG. 8 shows a side view of an illustrative battery system with a battery cover and integrated MSD removed, in accordance with some embodiments of the present disclosure.
Figure 9:
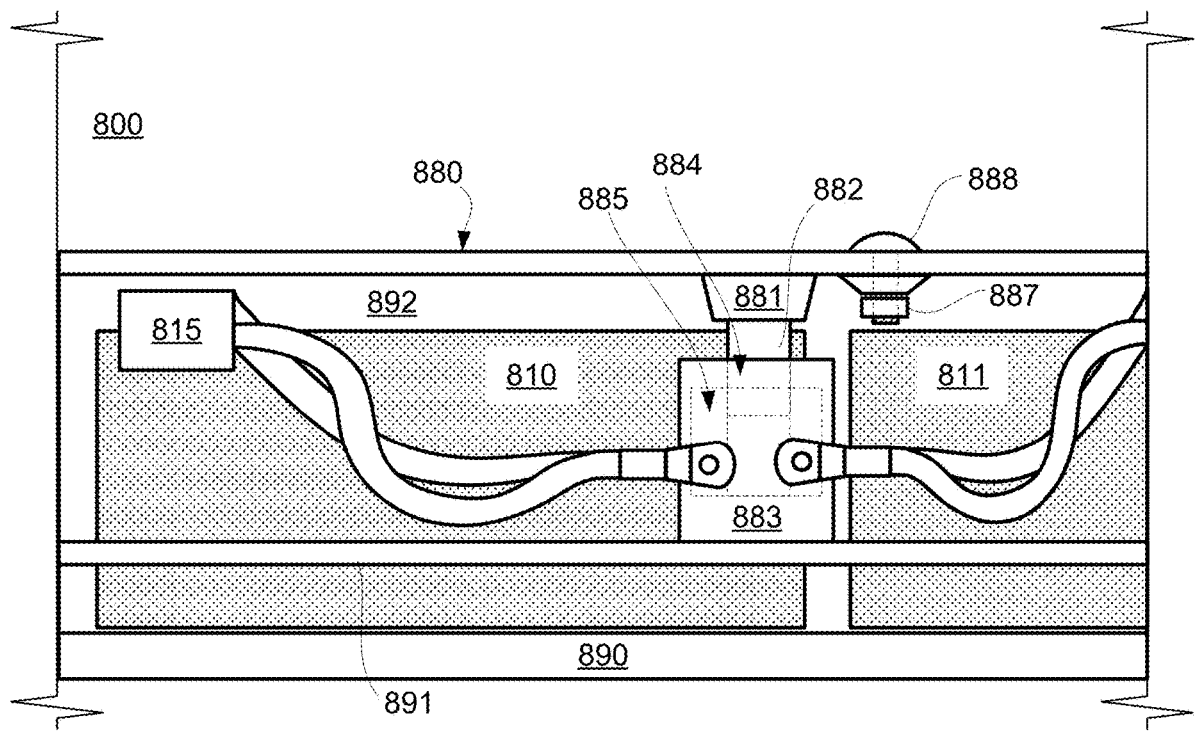
FIG. 9 shows a side view of the illustrative battery system of FIG. 8 with the battery cover and integrated MSD installed, in accordance with some embodiments of the present disclosure.

FIG. 8 shows a side view of illustrative battery system 800 with battery cover 880 and integrated MSD 850 removed, in accordance with some embodiments of the present disclosure. FIG. 9 shows a side view of illustrative battery system 800 of FIG. 8 with battery cover 880 and integrated MSD 850 installed, in accordance with some embodiments of the present disclosure.

Battery system 800 includes a plurality of battery modules (e.g., including battery modules 810 and 811), interconnect socket 883, interconnect cables 830 and 831, frame elements 890, 891, and 892 (e.g., including one or more side walls), and mounting nut 887 (e.g., affixed to frame element 892). Battery system 800 also includes battery cover 880. Battery cover 880 includes MSD 850 (e.g., which includes electrically conductive element 882 and body 881) and fastener 888. Fastener 888 is configured to engage with mounting nut 887 when cover 880 is installed. Mounting nut 887 provides securement and alignment for cover 880. Frame elements 890 and 891 are part of a battery housing, configured to house the battery modules (e.g., battery modules 810 and 811). Battery module 810 includes electrical terminal 815, and is arranged in series with battery module 811. Although interconnect cables 830 and 831 are illustratively shown as each including two cables, interconnect cables 830 and 831 may include one cable, or more than one cable (e.g., to allow easier bending, routing, and handling), a busbar, any other suitable connector, or any combination thereof.

Interconnect socket 883 is rigidly affixed to frame element 891, and is configured to electrically couple/decouple, in concert with MSD 850, battery modules 810 and 811 in series. Interconnect socket 883 includes recess 884, configured to engage with electrically conductive element 882 when cover 880 is installed (e.g., as shown in FIG. 9). Interconnect socket 883 also includes electrical terminals 885, coupled to respective interconnect cables 830 and 831. For example, interconnect cable 830 is coupled to electrical terminal 815 of battery module 810. Electrical terminals 885 do not electrically couple interconnect cables 830 and 831 together when battery cover 880 is not installed. When battery cover 880 is installed, electrically conductive element 882 electrically couples electrical terminals 885 together, and thus electrically couples battery modules 810 and 811 in series (e.g., making the full voltage of battery system 800 available). Because MSD 850 is relatively simple, having only a single installed state (e.g., no switches, or movable mechanisms), there is little to no ambiguity as to the electrical state of battery system 800. For example, if battery cover 880 is not installed then battery module 810 is decoupled from battery module 811, and if battery cover 880 is installed then battery module 810 is coupled to battery module 811.

In some embodiments, body 881 is electrically insulating, and accordingly electrically insulates electrically conductive element 882 from the exterior of battery cover 880 (e.g., where a user may have access). This insulation may be desired to prevent high voltage from being present on exterior portions of battery cover 880.

Illustrative MSD 850, as shown in FIGS. 8-9 includes a relatively simple geometry. Electrically conductive element 882 is illustrated as a blade, having a geometrically-simple shape and installed engagement (e.g., a flat blade and socket interface similar to a spade connector). However, a MSD having a simple geometry may allow corresponding terminals to be shorted more easily. For example, an interconnect socket for a blade connector might be able to be shorted by a conductor having a relatively simple geometry (e.g., a hand tool, fastener, plate, or other conductor which may fit in the socket). In some embodiments, it may be desired to include an MSD having relatively more complex structure. For example, FIGS. 10-11 shows an illustrate battery system having a geometrically more complex MSD.

Figure 10:
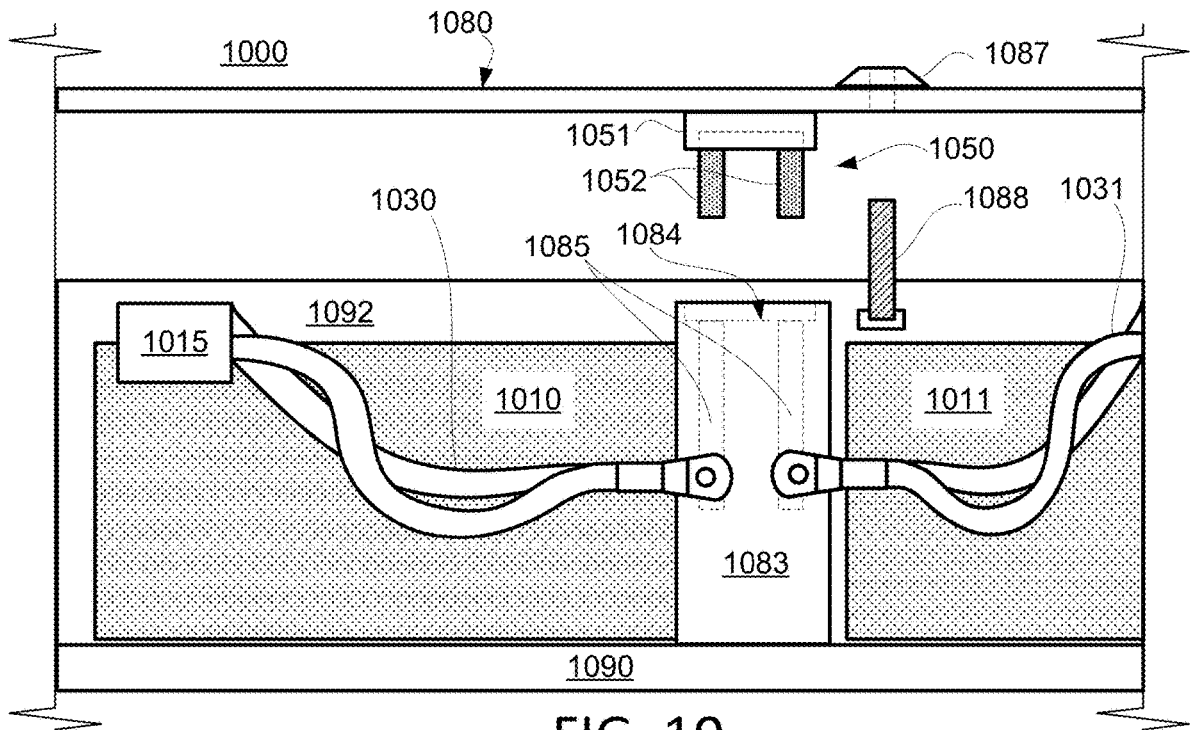
FIG. 10 shows a side view of an illustrative battery system with a battery cover and integrated MSD removed, in accordance with some embodiments of the present disclosure.
Figure 11:
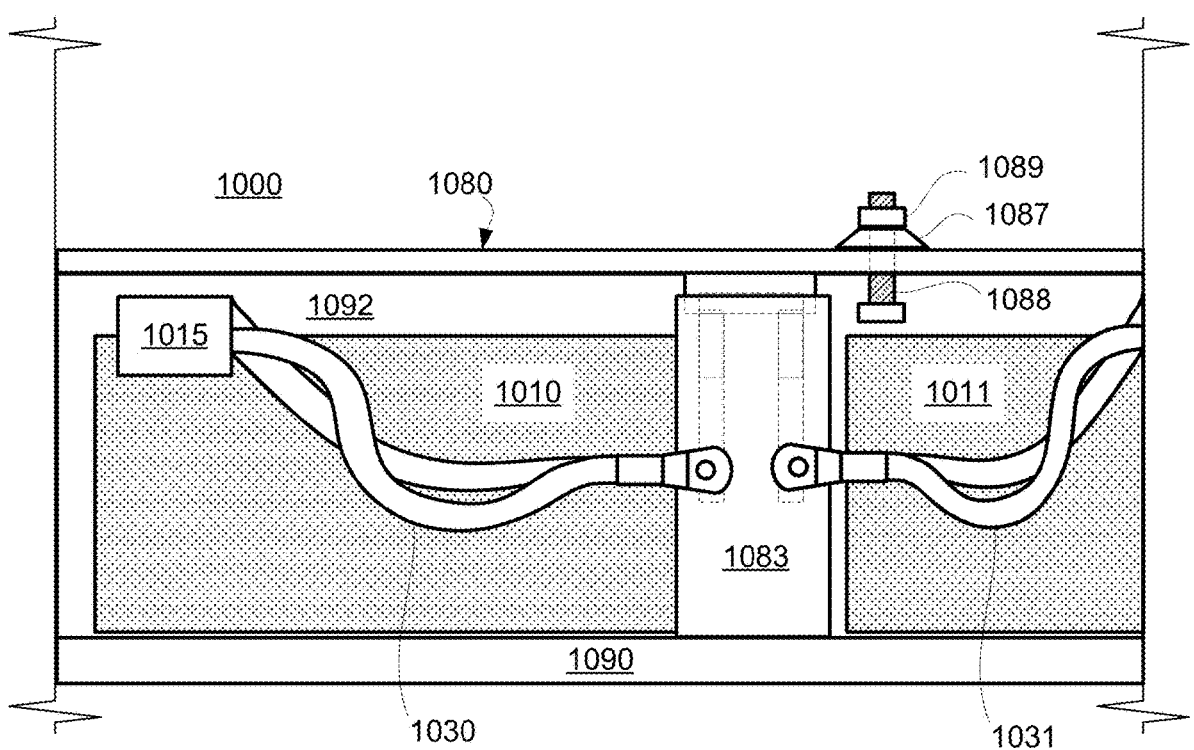
FIG. 11 shows a side view of the illustrative battery system of FIG. 8 with the battery cover and integrated MSD installed, in accordance with some embodiments of the present disclosure.

FIG. 10 shows a side view of illustrative battery system 1000 with battery cover 1080 and integrated MSD 1050 removed, in accordance with some embodiments of the present disclosure. FIG. 11 shows a side view of illustrative battery system 1000 of FIG. 10 with battery cover 880 and integrated MSD 1050 installed, in accordance with some embodiments of the present disclosure. MSD 1050, as illustrated in FIGS. 10-11, includes pinned electrical terminals.

Battery system 1000 includes a plurality of battery modules (e.g., including battery modules 1010 and 1011), interconnect socket 1083, interconnect cables 1030 and 1031, frame elements 1090, and 1092 (e.g., including one or more side walls), and fastener 1088 (e.g., a mounting stud affixed to frame element 1092). Battery system 1000 also includes battery cover 1080. Battery cover 1080 includes MSD 1050 (e.g., which includes two electrically conductive pins 1052 and body 1051) and fastener interface 1087 (e.g., a reinforced hole as illustrated in FIGS. 10-11). Pins 1052 are electrically coupled to each other, providing a contiguous current carrying path. Fastener 1088 is configured to engage with fastener interface 1087, and be secured with nut 1089 when cover 1080 is installed. Fastener 1088 provides securement and alignment for cover 1080. For example, fastener 1088 may extend sufficiently beyond frame element 1092 to prevent MSD 1050 from contacting any surface of battery system 1000 during installation unless fastener 1088 is aligned to fastener interface 1087. In a further example, a battery system may include a plurality of fasteners and fastener interfaces to more particularly align a cover and housing (e.g., and a MSD and an interconnect socket). Frame elements 1090 and 1092 are part of a battery housing, configured to house the battery modules (e.g., battery modules 1010 and 1011). Battery module 1010 includes electrical terminal 1015, and is arranged in series with battery module 1011. Although interconnect cables 1030 and 1031 are illustratively shown as each including two cables, interconnect cables 1030 and 1031 may include one cable, or more than one cable, a busbar, any other suitable connector, or any combination thereof.

Interconnect socket 1083 is rigidly affixed to frame element 1090, and is configured to, in concert with MSD 1050, electrically couple/decouple battery modules 1010 and 1011 in series. Interconnect socket 1083 includes recess 1084, configured to accommodate body 1051 when cover 880 is installed (e.g., as shown in FIG. 11). Interconnect socket 883 also includes electrical terminals 1085, which are configured to accommodate pins 1052 and are coupled to respective interconnect cables 1030 and 1031. For example, interconnect cable 1030 is coupled to electrical terminal 1015 of battery module 1010, and interconnect cable 1031 is coupled to battery module 1011. Electrical terminals 1085 do not electrically couple interconnect cables 1030 and 1031 together when battery cover 1080 is not installed. When battery cover 1080 is installed, pins 1052 electrically couple electrical terminals 1085 together, and thus couple battery modules 1010 and 1011 in series (e.g., making the full voltage of battery system 1000 available). Because MSD 1050 is relatively simple, having only a single installed state (e.g., no switches, or movable mechanisms), there is little to no ambiguity as to the electrical state of battery system 1000. For example, if battery cover 1080 is not installed then battery module 1010 is decoupled from battery module 1011, and if battery cover 1080 is installed then battery module 1010 is coupled to battery module 1011.

In some embodiments, body 1081 is electrically insulating, and accordingly electrically insulates pins 1052 from the exterior of battery cover 1080 (e.g., where a user may have access). This insulation may be desired to prevent high voltage from being present on exterior portions of battery cover 1080.

In some embodiments, pins 1052 and corresponding electrical terminals 1085 are configured to engage using any suitable pin-socket interface. Further, electrical terminals 1085 are recessed and require a two-pronged conductor to become electrically shorted. In some circumstances, this may be desired because the geometrical requirements of a foreign body that could short electrical terminals 1085 are correspondingly more complex. Because many unintended conductors are not pronged, or are unsuitably pronged to engage electrical terminals 1085, the risk of accidental shorting may be reduced. Accordingly, in some embodiments, electrical terminals, an interconnect socket, a MSD, or any suitable combination thereof may include geometrical features which reduce the likelihood of accidental electrical shorting.

It will be understood that a MSD may be configured to be installed and uninstalled using any suitable trajectory, in accordance with some embodiments of the present disclosure. In some embodiments, an MSD may be pushed into place and then secured with threaded fasteners. In some embodiments, an MSD may be pushed into place and then secured with a latch. In some embodiments, an MSD may be slid into place, with the motion being substantially parallel to a battery cover (e.g., using corresponding lips and guides). In some embodiments, an MSD may be twisted into place (e.g., a quarter-turn lock mechanism). Any suitable interface may be used to install and uninstall a MSD to terminals of a battery system such that a battery cover cannot be removed when the MSD is installed (e.g., in its installed position).

The foregoing describes, for example, using the MSD to sever the main current path in a battery system (e.g., between two adjacent battery modules). In some embodiments the MSD is used to sever a high voltage interlock loop. The interlock loop is connected to one or more electromechanical disconnect systems (e.g., one or more contactors). In some embodiments, the electromechanical disconnect is electrically connected to one of the battery modules of the battery system. In some embodiments, one or more of the electromechanical disconnects are electrically connected to high voltage components outside of the battery system (e.g., a DC motor, a power inverter, etc.). An interlock loop is energized with low voltage power (e.g., 12 volts). The one or more electromechanical disconnect systems monitor the interlock loop and detect when the interlock loop becomes an open circuit (e.g., when the interlock loop is severed). When the interlock loop becomes an open circuit, the electromechanical disconnect systems are prevented from being closed, thereby disconnecting power. Accordingly, by using the MSD of the present disclosure to sever an interlock loop, this ensures that the electromechanical disconnect systems connected to the interlock loop disconnect power when the battery cover is removed. It will be understood that the conductive path of the MSD can be sized according to its intended use. For example, when the MSD is used to sever the main current path of a battery system, the conductive path will be designed to handle the current and voltage of the battery system. When the MSD is used to sever an interlock loop, the conductive path will typically be a much smaller capacity path.

In some embodiments, the MSD of the present disclose includes two conductive elements, where each conductive element is configured to couple to respective first and second electrical terminals. The first conductive element is used to close the main current path of the battery system (e.g., between two battery modules of a battery system). The second conductive element is used to close the circuit of an interlock loop. By using two conductive elements, the MSD is able to disconnect power two independent ways. The first way is to create an open circuit in the main current path in the battery system. The second way is to sever the interlock loop, which causes the connected electromechanical disconnect systems to disconnect power.

In some embodiments, the high voltage interlock loop is a separate and dedicated signal path for controlling the connected electromechanical disconnect systems. In some embodiments, the high voltage interlock loop is integrated into existing signal paths or as an addition to existing signal paths. For example, the high voltage interlock loop can be integrated into the communications signal loop used by the battery module controller.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An interconnect for a battery system, comprising:
   at least one conductive element configured to couple a first electrical terminal of a first battery module and a second electrical terminal of a second battery module together, wherein the at least one conductive element comprises a single installed position that connects the first battery module and the second battery module in series to provide a voltage to an interface; and
   at least one feature configured to, when installed, prevent removal of a battery cover that covers the first electrical terminal and the second electrical terminal, wherein the interconnect is a rigid assembly, and wherein the at least one feature comprises a single installed position,
   wherein the at least one conductive element, when removed, disconnects the first battery module from the second battery module such that the first battery module and the second battery module are not connected in series and no voltage is provided to the interface.

2. The interconnect of claim 1, wherein the at least one conductive element comprises a single throw position.

3. The interconnect of claim 1, wherein when the interconnect is installed:
   the at least one conductive element comprises a single position relative to the battery system; and
   the at least one feature comprises a single position relative to the battery system.

4. The interconnect of claim 1, further comprising a fastener configured to engage with a housing of the battery system when installed.

5. The interconnect of claim 1, wherein the battery system comprises a plurality of battery modules including the first battery module and the second battery module, and wherein the at least one conductive element is configured to couple the first electrical terminal and the second electrical terminal at an intermediate node of the battery modules.

6. The interconnect of claim 1, wherein the interface is for coupling to a load, wherein the battery system further comprises the interface, and wherein the interconnect is configured to couple the first electrical terminal and the second electrical terminal at least a battery module's length away from the interface.

7. The interconnect of claim 1, wherein the battery system comprises:
   an interlock loop comprising the first electrical terminal and the second electrical terminal, wherein the at least one conductive element comprises a single installed position that closes the interlock loop; and
   an electromechanical disconnect system electrically coupled to the interlock loop, wherein the electromechanical disconnect system is prevented from being closed when the interlock loop is open.

8. The interconnect of claim 1, wherein the at least one conductive element and the at least one feature are rigidly coupled together, and cannot move relative to each other.

9. A battery system comprising:
   a first electrical terminal;
   a second electrical terminal;
   a first plurality of battery modules coupled together in series between the first electrical terminal and an interface;
   a second plurality of battery modules coupled together in series between the second electrical terminal and the interface, wherein the interface is configured to couple the first plurality of battery modules and the second plurality of battery modules to an electrical load;
   a battery cover configured to cover the first plurality of battery modules and the second plurality of battery modules to prevent access from outside the battery cover; and
   an interconnect configured to:
      when installed, prevent the battery cover from being removed and couple the first electrical terminal to the second electrical terminal, which couples the first plurality of battery modules in series with the second plurality of battery modules, to provide a voltage at the interface, and
      when removed, decouple the first electrical terminal from the second electrical terminal such that the first plurality of battery modules is not connected in series with the second plurality of battery modules and no voltage is provided to the interface and allow the battery cover to be removed.

10. The battery system of claim 9, wherein the interface and the interconnect are arranged with at least one battery module in between in at least one spatial dimension.

11. The battery system of claim 9, further comprising a housing to which the first plurality of battery modules and the second plurality of battery modules are affixed, wherein the cover is configured to engage with the housing.

12. The battery system of claim 11, further comprising an interconnect socket configured to engage with the interconnect, wherein the first electrical terminal and the second electrical terminal are arranged in the interconnect socket.

13. The battery system of claim 12, wherein the interconnect socket is rigidly affixed to the housing, and wherein the interconnect socket is configured to engage with the interconnect when the battery cover is installed.

14. The battery system of claim 9, wherein the interconnect is a substantially rigid body, and wherein the interconnect has a single installed position.

15. A battery system comprising:
   a first battery module;
   a second battery module;
   a first electrical terminal coupled to the first battery module;
   a second electrical terminal coupled to the second battery module; and
   a cover configured to, when installed, cover the first battery module and the second battery module,
   wherein the cover comprises a conductive element configured to, when installed, electrically couple the first electrical terminal to the second electrical terminal, which causes the first battery module to be connected in series with the second battery module, and
   wherein the conductive element is constrained to not move relative to the rest of the cover.

16. The battery system of claim 15, wherein the conductive element is further configured to, when the cover is removed, electrically decouple the first electrical terminal from the second electrical terminal, which breaks the series connection between the first battery module and the second battery module.

17. The battery system of claim 15, wherein the conductive element comprises:
   a first metal pin configured to engage the first electrical terminal; and
   a second metal pin configured to engage the second electrical terminal, wherein the second metal pin is electrically coupled to the first metal pin.

18. The battery system of claim 15, wherein the conductive element comprises a blade configured to engage the first electrical terminal and the second electrical terminal.

19. The battery system of claim 15, further comprising:
a housing to which the cover is configured to engage with;
an interconnect socket affixed to the housing, wherein the first electrical terminal and the second electrical terminal are arranged in the interconnect socket; and
at least one locating feature configured to align the cover to the housing when the cover is installed.

20. The battery system of claim 12, wherein the interface is arranged on a first side of the housing and the interconnect socket is arranged on a second side of the housing opposite the first side.

21. The battery system of claim 19, further comprising an interface configured to couple the first battery module and the second battery module to an electrical load, wherein the interface is arranged on a first side of the housing and the interconnect socket is arranged on a second side of the housing opposite the first side.

\* \* \* \* \*